(12) United States Patent
Lee et al.

(10) Patent No.: US 7,369,298 B2
(45) Date of Patent: May 6, 2008

(54) OPTICAL SCANNER AND LASER IMAGE PROJECTOR USING THE SAME

(75) Inventors: Jin-ho Lee, Gyeonggi-do (KR); Young-chul Ko, Gyeonggi-do (KR); Hyun-ku Jeong, Chungcheongbuk-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 93 days.

(21) Appl. No.: 11/147,344

(22) Filed: Jun. 8, 2005

(65) Prior Publication Data

US 2006/0023284 A1 Feb. 2, 2006

(30) Foreign Application Priority Data

Jul. 28, 2004 (KR) .................. 10-2004-0059112

(51) Int. Cl.
*A61B 26/00* (2006.01)
*A61B 26/08* (2006.01)

(52) U.S. Cl. ..................... 359/295; 359/212
(58) Field of Classification Search ........... 359/212, 359/214, 221, 225, 290–291, 295, 298, 196–198, 359/224–226
See application file for complete search history.

(56) References Cited

U.S. PATENT DOCUMENTS

| | | | |
|---|---|---|---|
| 6,643,053 B2 * | 11/2003 | Li et al. ............... | 359/290 |
| 6,681,063 B1 * | 1/2004 | Kane et al. ........... | 385/18 |
| 6,744,173 B2 * | 6/2004 | Behin et al. .......... | 310/309 |
| 6,764,183 B2 * | 7/2004 | Okazaki ............... | 353/31 |
| 6,972,883 B2 * | 12/2005 | Fujii et al. ............ | 359/224 |
| 7,116,465 B2 * | 10/2006 | Maeda et al. ......... | 359/291 |
| 2002/0005976 A1 * | 1/2002 | Behin et al. .......... | 359/254 |
| 2003/0011751 A1 * | 1/2003 | Sakata et al. ......... | 353/30 |
| 2003/0227538 A1 * | 12/2003 | Fujii et al. ............ | 347/260 |

* cited by examiner

*Primary Examiner*—Scott J. Sugarman
*Assistant Examiner*—DaWayne A Pickney
(74) *Attorney, Agent, or Firm*—Buchanan Ingersoll & Rooney PC (57) ABSTRACT

Provided are an optical scanner including a micro-mirror having an improved a driving angle by using a micro-electro-mechanical system (MEMS) technique and a laser image projector using the same are provided. The optical scanner includes: a substrate; a mirror unit suspended over the substrate and spaced apart from the substrate by a predetermined distance; a supporter situated on the substrate and supporting both ends of the mirror unit so that the mirror unit is suspended over the substrate; a supporting axis connected between both ends of the mirror unit and the supporter so that the mirror unit can be rotatably supported by the supporter; a plurality of movable comb electrodes vertically formed on both sides of the mirror unit; and a plurality of static comb electrodes vertically formed on the substrate in such a way that the static comb electrodes alternate with the movable comb electrodes, wherein the static comb electrode is a two-layer structured electrode.

22 Claims, 5 Drawing Sheets

OPTICAL SCANNER AND LASER IMAGE PROJECTOR USING THE SAME

CROSS-REFERENCE TO RELATED PATENT APPLICATION

This application claims the priority of Korean Patent Application No. 10-2004-0059112, filed on Jul. 28, 2004, in the Korean Intellectual Property Office, the disclosure of which is incorporated herein in its entirety by reference.

BACKGROUND

1. Field of the Invention

An embodiment of the present invention relates to an optical scanner having an improved driving angle and a laser image projector using the same, and more particularly, to an optical scanner including a micro-mirror having an increased improved angle by using a micro-electro-mechanical system (MEMS) technique and a laser image projector using the same.

2. Description of the Related Art

Figure 1:
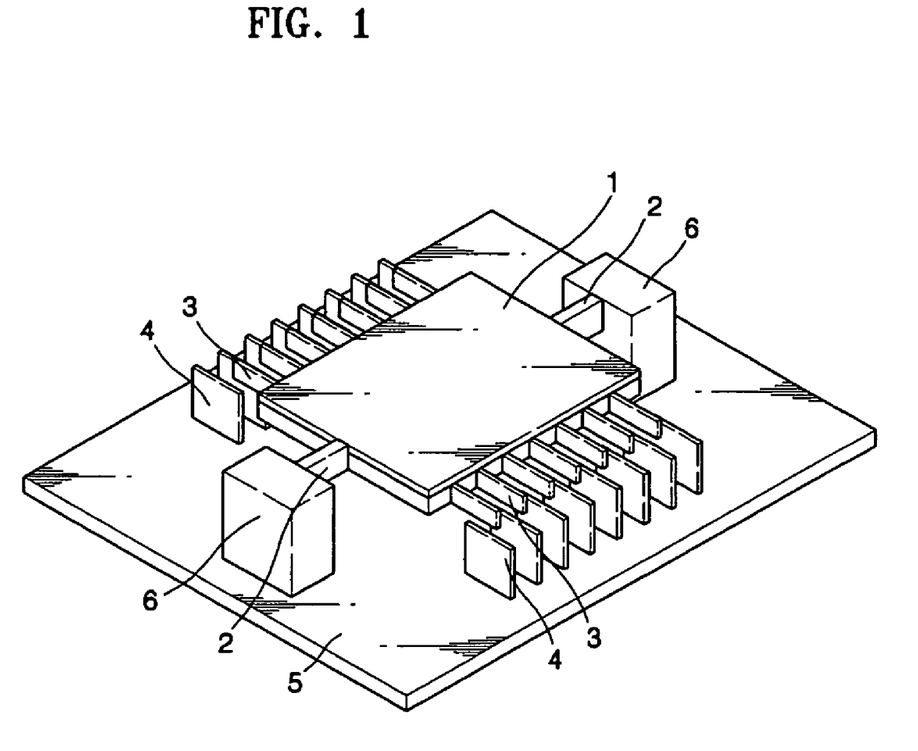
FIG. 1 is a perspective view illustrating a structure of a conventional optical scanner.

A MEMS micro-actuator structure using an electrostatic effect of a comb-typed electrode is used as an optical scanner for deflecting a laser beam in a projection TV. FIG. 1 is a perspective view illustrating a structure of a conventional optical scanner. As shown in FIG. 1, the conventional optical scanner includes a substrate 5, a mirror unit 1 suspended over the substrate 5, a supporter 6 supporting both ends of the mirror unit 1, a torsion spring 2 connected between the mirror unit 1 and the supporter 6 and supporting a seesaw movement of the mirror unit 1, a plurality of movable comb electrodes 3 vertically formed on both sides of the mirror unit 1, and a plurality of static comb electrodes 4 vertically formed on the substrate 5 in such a way that the static comb electrodes alternate with the movable comb electrodes.

Figure 2:
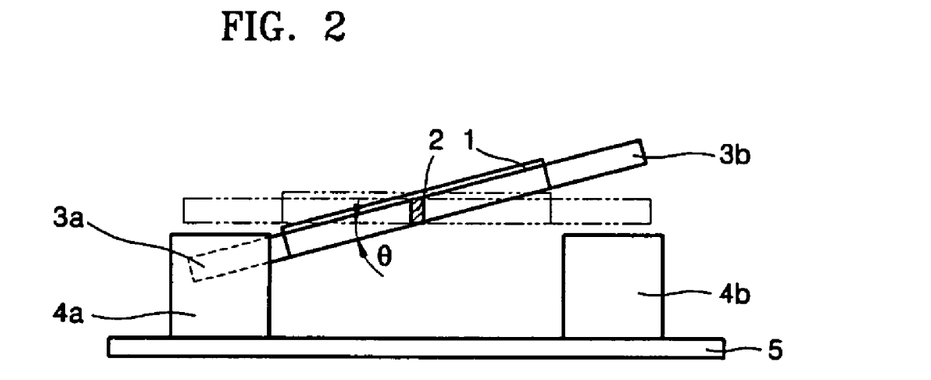
FIG. 2 is a sectional view illustrating an operation of the conventional optical scanner shown in FIG. 1.

FIG. 2 is a sectional view illustrating an operation of the conventional optical scanner shown in FIG. 1. Referring to FIG. 2, a predetermined voltage is applied to movable comb electrodes 3a and 3b formed on both sides of the mirror unit 1, and a positive voltage and a negative voltage are respectively applied to static comb electrodes 4a and 4b corresponding to the movable comb electrodes 3a and 3b. For example, a voltage V1 is applied to both the left movable comb electrode 3a and the right movable comb electrode 3b, a voltage V is applied to the left static comb electrode 4a and a voltage –V is applied to a right static comb electrode 4b. Then, a voltage difference between the left movable comb electrode 3a and the left static comb electrode 4a becomes different from a voltage difference between the right movable comb electrode 3b and the right static comb electrode 4b, and thereby the mirror unit 1 is inclined to one side by static electrical force, as shown in FIG. 2. In the meantime, the mirror unit 1 returns to its original place by restoration force of the torsion spring 2. Therefore, the mirror unit 1 can be periodically moved by a predetermined driving angle and a predetermined driving speed (i.e., driving frequency) by properly adjusting the voltage applied to the movable comb electrodes 3.

In the meantime, an optical scanner should scan a laser beam at very rapid speed in order to embody an image on a screen of a laser image projector. In general, a mirror unit should have small mass in order to increase its driving frequency. However, if the size of mirror unit 1 is reduced in order to decrease its mass, then a diameter of a laser beam reflected by the mirror unit 1 is also decreased. However, if the diameter of the laser beam reflected by the mirror unit 1 is decreased, then the laser beam is spread on the screen. This phenomenon deteriorates resolution of an image displayed on the screen.

Therefore, in order to increase resolution of an image, the size of the mirror unit 1 should be increased so that a laser beam having a large diameter can be reflected by the mirror unit 1, or a driving angle of the mirror unit 1 should be increased. However, if the size of the mirror unit 1 is increased, then a driving speed of the optical scanner is decreased due to the mass increase of the mirror unit 1. Also, there is a limitation in increasing a driving angle of the mirror unit 1. This is because if the movable comb electrodes 3 completely enter between the static comb electrodes 4, then the driving force is not generated anymore and thereby the mirror unit 1 does not rotate anymore. In this case, in order to increase the driving angle of the mirror unit 1, the height of the movable comb electrodes 3 and the static comb electrodes 4 should be increased so that an angle at which the movable comb electrode 3 and the static comb electrode 4 completely overlap each other is increased. However, this increase in thickness of the mirror unit 1 for increased the driving angle also causes an increase in the mass of the mirror unit 1.

SUMMARY

An embodiment of the present invention provides a method of improving the resolution of an optical scanner by increasing a driving angle of the optical scanner without increasing a thickness of a mirror unit.

Also, the present invention may provide an optical scanner having an increased driving angle and a laser image projector using the same.

According to an aspect of the present invention, an optical scanner may include: a substrate; a mirror unit suspended over the substrate and spaced apart from the substrate by a predetermined distance; a supporter situated on the substrate and supporting both ends of the mirror unit so that the mirror unit may be suspended over the substrate; a supporting axis connected between both ends of the mirror unit and the supporter so that the mirror unit can be rotatably supported by the supporter; a plurality of movable comb electrodes vertically formed on both sides of the mirror unit; and a plurality of static comb electrodes vertically formed on the substrate in such a way that the static comb electrodes alternate with the movable comb electrodes, wherein the static comb electrode may be a two-layer structured electrode.

The two-layer structured static comb electrode may include: a first static comb electrode formed on the substrate; an insulation layer formed on the first static comb; and a second static comb electrode formed on the insulation layer. An absolute value of a voltage applied to the first static comb electrode may be larger than an absolute value of a voltage applied to the second static comb electrode.

According to another aspect of the present invention, an optical scanner may include: a mirror unit reflecting a light; an upper substrate arranged over the mirror unit and spaced apart from the mirror unit by a predetermined distance; a lower substrate arranged under the mirror unit and spaced apart from the mirror unit by a predetermined distance; a supporter supporting both ends of the mirror unit so that the mirror unit may be suspended between the upper substrate and the lower substrate; a supporting axis connected between both ends of the mirror unit and the supporter so that the mirror unit can be rotatably supported by the supporter; a plurality of movable comb electrodes vertically formed on both sides of the mirror unit; a plurality of upper static comb electrodes vertically arranged on a lower surface of the upper substrate in such a way that the upper static comb electrodes alternate with the movable comb electrodes; and a plurality of lower static comb electrodes vertically arranged on the lower substrate in such a way that the lower static comb electrodes alternate with the movable comb electrodes, wherein the upper static comb electrode and the lower static comb electrode are a two-layer structured electrode.

The two-layer structured upper static comb electrode may include: a first upper static comb electrode vertically formed on a lower surface of the upper substrate in such a way that the first upper static comb electrode alternates with the movable comb electrode; an insulation layer formed on the first upper static comb electrode; and a second upper static comb electrode formed on the insulation layer. Similarly, the two-layer structured lower static comb electrode may include: a first lower static comb electrode vertically formed on the upper surface of the lower substrate in such a way that the first lower static comb electrode alternates with the movable comb electrode; an insulation layer formed on the first lower static comb electrode; and a second lower static comb electrode formed on the insulation layer.

According to a further another aspect of the present invention, a laser image projector includes: a plurality of light sources respectively emitting monochromatic lights of different wavelengths; light modulators respectively modulating the monochromatic lights according to their color signals; a light combiner combining the modulated monochromatic lights from the light modulators into a beam; an optical scanner scanning the combined beam so that the combined beam forms a picture; and a screen on which the scanned picture is formed. The optical scanner may include: a substrate; a mirror unit suspended over the substrate and spaced apart from the substrate by a predetermined distance; a supporter situated on the substrate and supporting both ends of the mirror unit so that the mirror unit is suspended over the substrate; a supporting axis connected between both ends of the mirror unit and the supporter so that the mirror unit can be rotatably supported by the supporter; a plurality of movable comb electrodes vertically formed on both sides of the mirror unit; and a plurality of static comb electrodes vertically formed on the substrate in such a way that the static comb electrode alternates with the movable comb electrode, wherein the static comb electrode may be a two-layer structured electrode.

According to still another aspect of the present invention, a laser image projector includes: a plurality of light sources respectively emitting monochromatic lights of different wavelengths; light modulators respectively modulating the monochromatic lights according to their color signals; a light combiner combining the modulated monochromatic lights from the light modulators into a beam; an optical scanner scanning the combined beam so that the combined beam forms a picture; and a screen on which the scanned picture is formed. The optical scanner may include: a mirror unit reflecting a light; an upper substrate arranged over the mirror unit and spaced apart from the mirror unit by a predetermined distance; a lower substrate arranged under the mirror unit and spaced apart from the mirror unit by a predetermined distance; a supporter supporting both ends of the mirror unit so that the mirror unit may be suspended between the upper substrate and the lower substrate; a supporting axis connected between both ends of the mirror unit and the supporter so that the mirror unit can be rotatably supported by the supporter; a plurality of movable comb electrodes vertically formed on both sides of the mirror unit; a plurality of upper static comb electrodes vertically arranged on a lower surface of the upper substrate in such a way that the upper static comb electrodes alternate with the movable comb electrodes; and a plurality of lower static comb electrodes vertically arranged on the lower substrate in such a way that the lower static comb electrodes alternate with the movable comb electrodes, wherein the upper static comb electrode and the lower static comb electrode may be a two-layer structured electrode.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Reference will now be made in detail to a structure and operation of an optical scanner and a laser image projector using the same according to the embodiments of the present invention.

Figure 3:
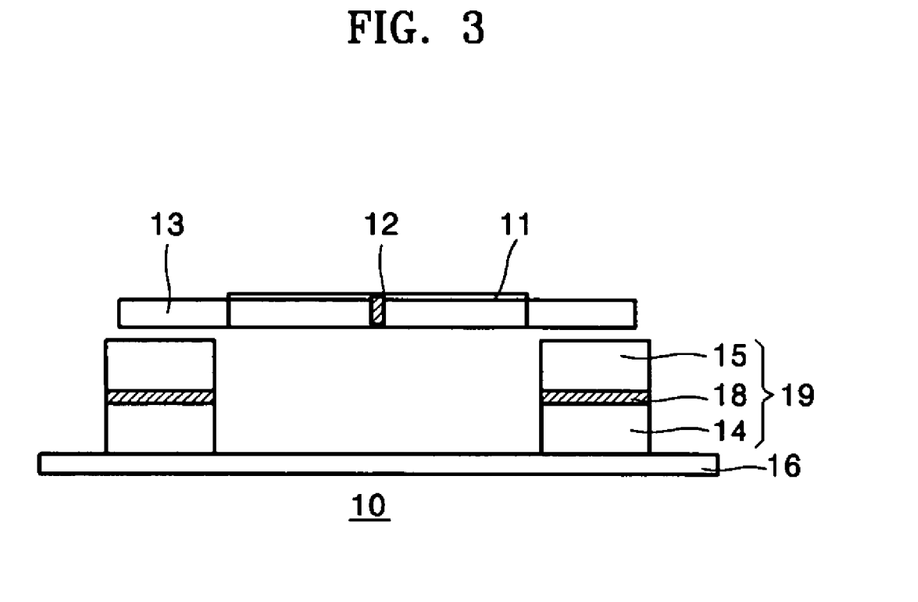
FIG. 3 is a sectional view schematically illustrating a structure of an optical scanner according to a first embodiment of the present invention.

FIG. 3 is a perspective view schematically illustrating a structure of an optical scanner 10 according to a first embodiment of the present invention. Referring to FIG. 3, the optical scanner 10 may include a substrate 16 made of glass, for example, a mirror unit 11 suspended over the substrate 16 and spaced apart from the substrate 16 by a predetermined distance, a supporter (not shown) situated on the substrate 16 and supporting both ends of the mirror unit 11, a supporting axis 12 connected between both ends of the mirror unit 11 and the supporter so that the mirror unit 11 can be rotatably supported by the supporter, a plurality of movable comb electrodes 13 vertically formed on both sides of the mirror unit 11, and a plurality of static comb electrodes 19 vertically formed on the substrate 16 in such a way that the static comb electrodes alternate with the movable comb electrodes. As shown in FIG. 3, the optical scanner 10 may be characterized in that the static comb electrode 19 may be a two-layer structured electrode, unlike the conventional optical scanner shown in FIG. 2.

The static comb electrode 14 and 15 may include a first static comb electrode 14 vertically formed on the substrate 16 in such a way that the first static comb electrode 14 alternates with the movable comb electrode 13, an insulation layer 18 formed on the first static comb electrode 14, and a second static comb electrode 15a formed on the insulation layer 18. The insulation layer 18 may electrically separate the first static comb electrode 14 from the second static comb electrode 15 so that a separate voltages can be applied to the first static comb electrode 14a and the second static comb electrode 15, respectively. The movable comb electrodes 13 may be vertically formed on both sides of the mirror unit 11 at a regular interval in the same manner as the movable comb electrodes 3 shown in FIG. 1. For example, the supporting axis 12 may be a torsion spring formed between both ends of the mirror unit 11 and the supporter.

Figure 4A:
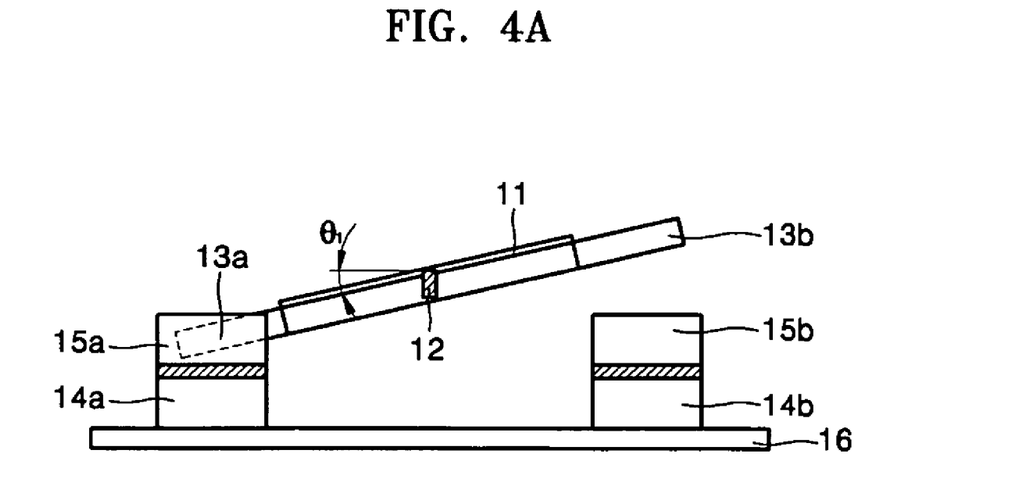
FIGS. 4A and 4B are sectional views illustrating an operation of the optical scanner according to the first embodiment of the present invention.
Figure 4B:
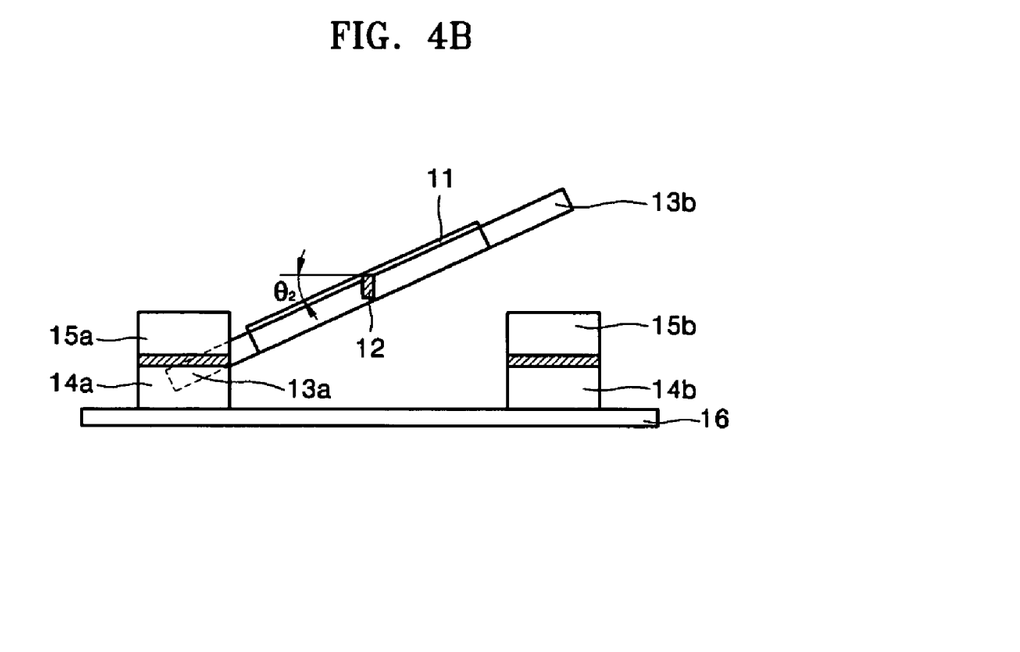

FIGS. 4A and 4B are sectional views illustrating an operation of the optical scanner 10 according to the first embodiment of the present invention. Referring to FIGS. 4A and 4B, first, the same voltage V may be applied to the movable comb electrodes 13a and 13b formed on both sides of the mirror unit 11, and a positive voltage and a negative voltage may be respectively applied to the second static comb electrodes 15a and 15b corresponding to the movable comb electrodes 13a and 13b. For example, in FIGS. 4A and 4B, the voltage V may be applied to both the left movable comb electrode 13a and the right movable comb electrode 13b, and a voltage $V_I$ may be applied to the second static comb electrode 15a and a voltage $-V_I$ may be applied to the second static comb electrode 15b. Then, a voltage difference $(V-V_I)$ between the left movable comb electrode 13a and the second static comb electrode 15a becomes different from a voltage difference $(V+V_I)$ between the right movable comb electrode 13b and the second static comb electrode 15b, and thereby the mirror unit 11 may be inclined to one side by static electrical force, as shown in FIG. 4A. In case where a voltage may be applied only to the second static comb electrodes 15a and 15b, the optical scanner 10 has a driving angle $\theta_1$ like the conventional optical scanner.

Here, in order to increase the driving angle of the optical scanner, a positive voltage and a negative voltage may be respectively applied to the first static comb electrodes 14a and 14b corresponding to the movable comb electrodes 13a and 13b. For example, in FIG. 4B, a voltage $V_{II}$ may be applied to the first static comb electrode 14a and a voltage $-V_{II}$ may be applied to the first static comb electrode 14b. At this moment, an absolute value of the voltage applied to the first static comb electrodes 14a and 14b should be larger than an absolute value of the voltage applied on the second static comb electrodes 15a and 15b. That is, $V_{II} > V_I$ is required. This is because if $V_{II} \leq V_I$, then the first static comb electrodes 14a and 14b cannot provide any driving force to the movable comb electrodes 13a and 13b when the movable comb electrodes 13a and 13b completely enter between the second static comb electrodes 15a and 15b. In other words, only when a voltage difference between the first static comb electrode 14 and the movable comb electrode 13 is larger than a voltage difference between the second static comb electrode 15 and the movable comb electrode 13, the movable comb electrode 13 completely entering between the second static comb electrodes 14 is provided with a driving force. In this manner, when a voltage larger than a voltage applied to the second static comb electrode 15 is applied to the first static comb electrode 14, the movable comb electrode 13 is additionally rotated as shown in FIG. 4B. Therefore, the optical scanner 10 has a driving angle $\theta_2$ larger than the driving angle of the conventional optical scanner. This increase in the driving angle can increase the resolution of a laser image projector.

Here, a process of applying a voltage to the first and second static comb electrodes 14 and 15 may be controlled in various manners. For example, for a driving angle $\theta_2$, a voltage may be simultaneously applied to the first static comb electrode 14 and the second static comb electrode 15, or a voltage may be applied to the first static comb electrodes 14 after the movable comb electrode 13 completely enters between the second static comb electrodes 15. Also, for a driving angle $\theta_1$, a voltage may be applied only to the second static comb electrode 15.

Figure 5:
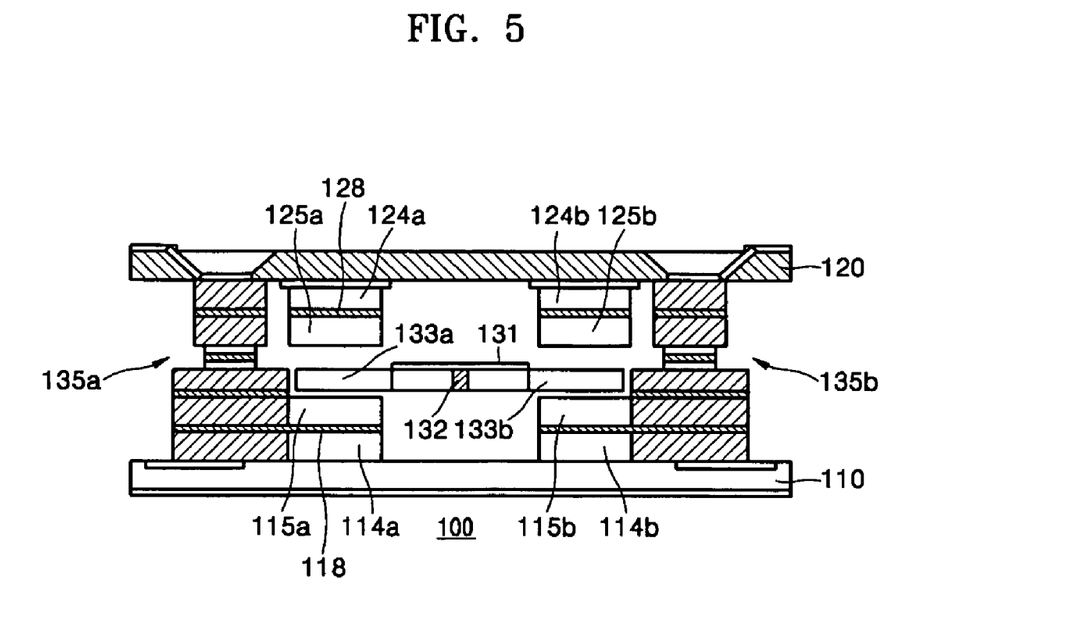
FIG. 5 is a sectional view schematically illustrating a structure of an optical scanner according to a second embodiment of the present invention.

FIG. 5 is a sectional view schematically illustrating a structure of an optical scanner 100 according to a second embodiment of the present invention. Referring to FIG. 5, the optical scanner 100 may include a mirror unit 131 reflecting light, an upper substrate 120 arranged over the mirror unit 131 and spaced apart from the mirror unit 131 by a predetermined distance, a lower substrate 110 arranged under the mirror unit 131 and spaced apart from the mirror unit 131 by a predetermined distance, a supporter (not shown) supporting both ends of the mirror unit 131 so that the mirror unit 131 is suspended between the upper substrate 120 and the lower substrate 110, a supporting axis 132 connected between both ends of the mirror unit 131 and the supporter so that the mirror unit 131 can be rotatably supported by the supporter, a plurality of movable comb electrodes 133a and 133b vertically formed on both sides of the mirror unit 131, a plurality of upper static comb electrodes 124a, 124b, 125a and 125b vertically arranged on a lower surface of the upper substrate 120 in such a way that the upper static comb electrodes alternate with the movable comb electrodes, and a plurality of lower static comb electrodes 114a, 114b, 115a and 115b vertically arranged on the lower substrate 110 in such a way that the lower static comb electrodes alternate with the movable comb electrodes. Hereinafter, for brevity, a reference numeral may be used to collectively indicate two or more elements that are associated with the reference numeral. For instance, a numeral 114 collectively refers to the lower static comb electrodes 114a and 114b. The upper static comb electrode and the lower static comb electrode are a two-layered electrode. The upper substrate 120 may be connected to the lower substrate 110 by a connection unit 135a and 135b located around the outside of the static comb electrodes. Also, an opening (not shown) may be formed in the upper substrate 120 so that light can enter and leave the mirror unit 131. When compared to the optical scanner 10 according to the first embodiment of the present invention, the optical scanner 100 may have not only a static comb electrode arranged over the mirror unit 131 but also a static comb electrode arranged under the mirror unit 131. Therefore, the optical scanner 100 may provide the mirror unit 131 with a larger driving force more stably.

The upper static comb electrodes 124 and 125 may include a first upper static comb electrode 124 vertically formed on the lower surface of the upper substrate 120 in such a way that the first upper static comb electrode 124 alternates with the movable comb electrode 133, an insulation layer 128 formed on the first upper static comb electrode 124, and a second upper static comb electrode 125 formed on the insulation layer 128. Similarly, the lower static comb electrodes 114 and 115 may include a first lower static comb electrode 114 vertically formed on the upper surface of the lower substrate 110 in such a way that the first lower static comb electrode 114 alternates with the movable comb electrode 133, an insulation layer 118 formed on the first lower static comb electrode 114, and a second lower static comb electrode 115 formed on the insulation layer 118. The insulation layers 118 and 128 electrically may separate the first static comb electrodes 114 and 124 from the second static comb electrodes 115 and 125 so that separate voltages can be applied on the first static comb electrodes 114 and 124 and the second static comb electrodes 115 and 125, respectively. The movable comb electrodes 133 are vertically formed on both sides of the mirror unit 131 at a regular interval in the same manner as in the first embodiment of the present invention. For example, the supporting axis 132 may be a torsion spring formed between both ends of the mirror unit 131 and the supporter.

An operation of the optical scanner 100 may be substantially identical to an operation of the optical scanner 10. That is, a voltage larger than a voltage applied to the second static comb electrodes 115 and 125 may applied to the first static comb electrodes 114 and 124. As a result, when the movable comb electrode 133 completely enters between the second static comb electrodes 115 and 125, a driving force can be provided to the movable comb electrode 133 by using the first static comb electrodes 114 and 124.

At this moment, a voltage of the same size and polarity is applied to the electrodes symmetrically positioned with respect to the supporting axis 132 so that the movable comb electrode 133 can be stably rotated. For example, in FIG. 5, a voltage $V_I$ may be applied to a second upper static comb electrode 125a and a second lower static comb electrode 115b, and a voltage $-V_I$ may be applied to a second lower static comb electrode 115a and a second upper static comb electrode 125b. Further, a voltage $V_{II}$ may be applied to a first upper static comb electrode 124a and a first lower static comb electrode 114b, and a voltage $-V_{II}$ may be applied to a first lower static comb electrode 114a and a first upper static comb electrode 124b. As stated above, an absolute value of the voltage applied to the first static comb electrodes 114 and 124 should be larger than an absolute value of the voltage applied to the second static comb electrodes 115 and 125 so that the first static comb electrode 114 and 124 can provide a driving force to the movable comb electrode 133 when the movable comb electrode 133 completely enters between the second static comb electrodes 115 and 125. That is, $V_{II} > V_I$ is required.

A process of applying a voltage to the first and second static comb electrodes 114, 115, 124 and 125 may be controlled in various manners. For example, for an increased driving angle of the optical scanner 100, a voltage may be simultaneously applied to the first static comb electrode 114 and 124 and the second static comb electrode 115 and 125, or a voltage may be applied to the first static comb electrodes 114 and 124 after the movable comb electrode 133 completely enters between the second static comb electrodes 115 and 125. Also, for a driving angle $θ_1$, a voltage may be applied only to the second static comb electrodes 115 and 125.

Figure 6:
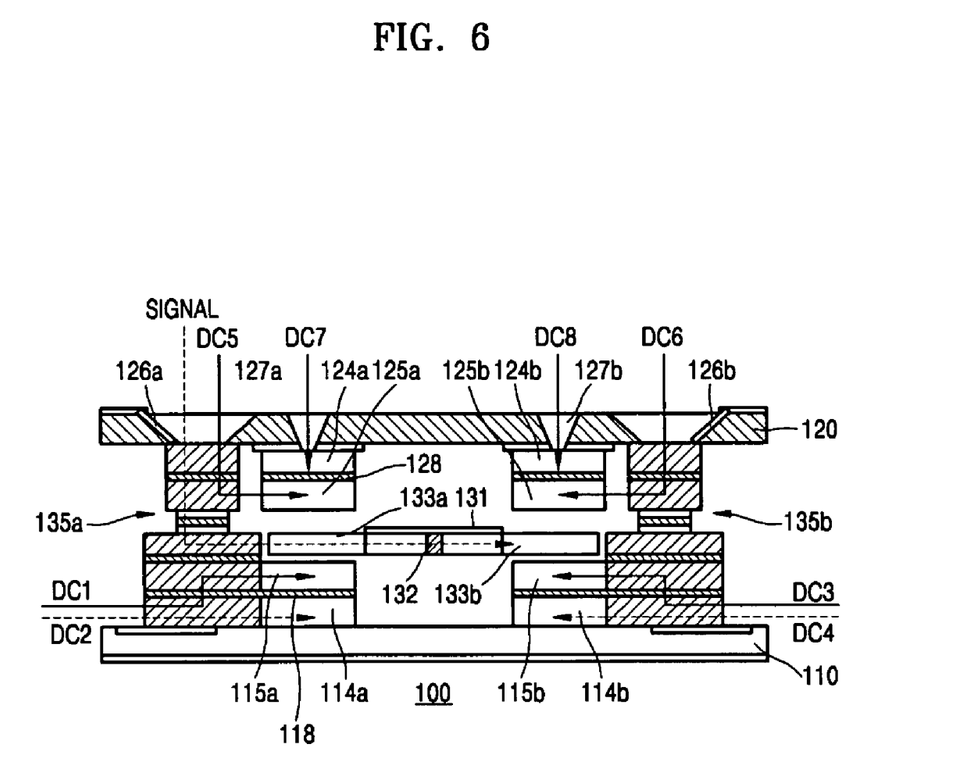
FIG. 6 is a sectional view schematically illustrating a wiring structure of the optical scanner according to the second embodiment of the present invention.

FIG. 6 is a sectional view schematically illustrating a wiring structure of the optical scanner 100 according to the second embodiment of the present invention. As shown in FIG. 6, the wiring structure can be made by using the connection unit 135a and 135b connecting and supporting the upper substrate 120 and the lower substrate 110 and a plurality of electrode holes 126 and 127. For example, a power line for DC1 and DC3 may be connected to the second lower static comb electrodes 115a and 115b through the connection unit 135a and 135b of the lower substrate 110. A power line for DC2 and DC4 may be connected to the first lower static comb electrodes 114a and 114b through a bottom of the lower substrate 110. A power line for DC5 and DC6 may be connected to the second upper static comb electrodes 125a and 125b through second electrode holes 126a and 126b formed on the upper substrate 120 and the connection unit 135a and 135b. Lastly, a power line for DC7 and DC8 may be connected to the first upper static comb electrodes 124a and 124b through first electrode holes 127a and 127b formed on the upper substrate 120. In the meantime, a signal line may be connected to the movable comb electrode 133 through the second electrode hole 126a, the connection unit 135a and the supporting axis 132. A rotary motion of the mirror unit 131 may be controlled according to a voltage applied to the movable comb electrode 133 through the signal line.

Figure 7:
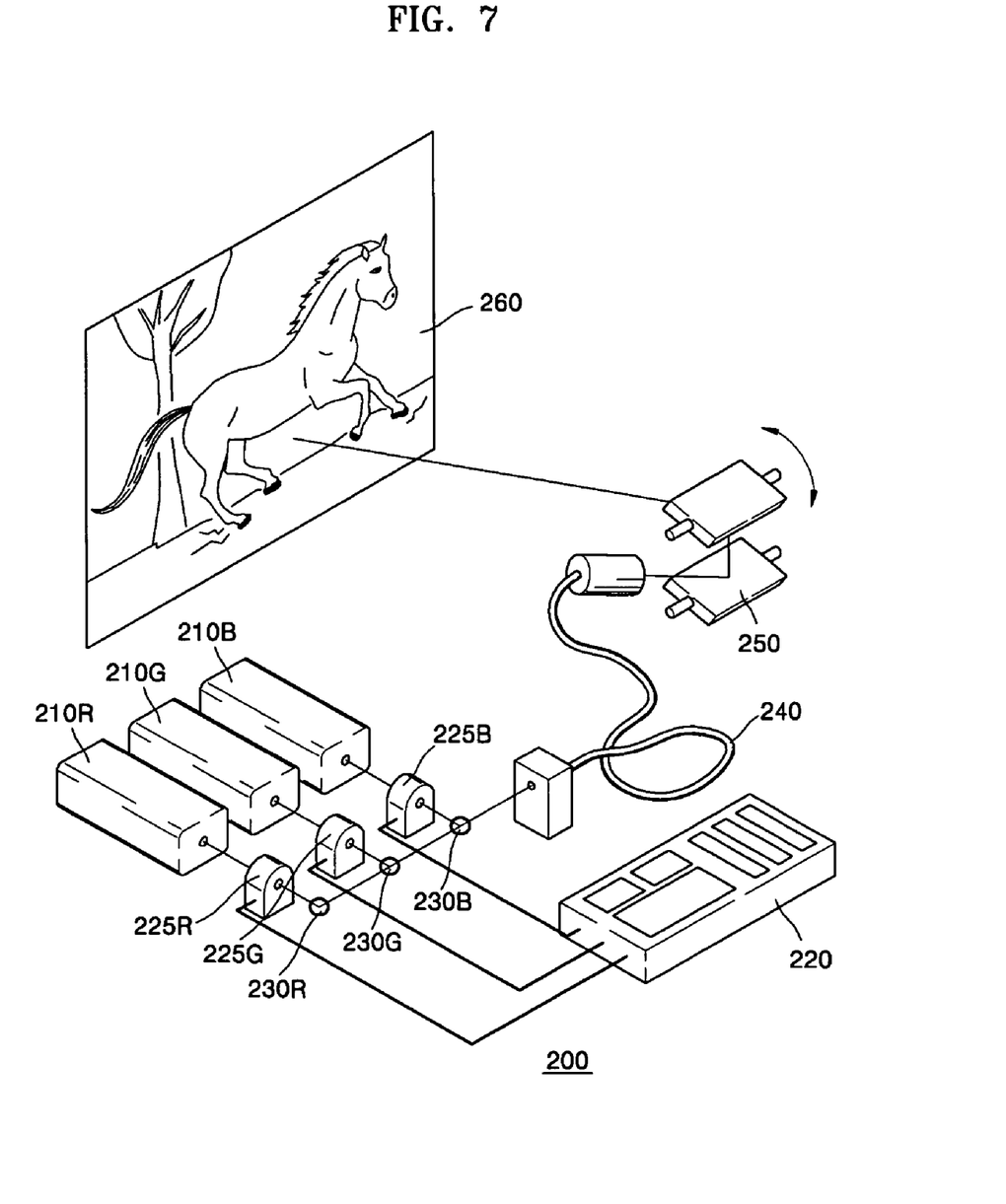
FIG. 7 is a perspective view schematically illustrating a laser image projector using an optical scanner according to the present invention.

FIG. 7 is a perspective view schematically illustrating a laser image projector 200 using an optical scanner according to the present invention. As shown in FIG. 7, the laser image projector 200 includes a plurality of light sources 210, respectively, emitting monochromatic lights of different wavelengths, light modulators 225 respectively modulating the monochromatic lights according to their color signals, a light combiner 230 combining the modulated monochromatic lights from the light modulators 225 into a beam, an optical scanner 250 scanning the combined beam so that the combined beam forms a picture, and a screen 260 on which the scanned picture is formed.

Referring to FIG. 7, the light sources 210 may be three lasers 210R, 210G and 210B emitting three original colors such as R, G, and B (red/green/blue). The RGB lights emitted from the three lasers 210R, 210G and 210B are, respectively, injected into the light modulator 225R, 225G and 225B. The light modulator 225R, 225G and 225B modulate the injected RGB lights according to a control operation of the control unit 220. The modulated RGB lights from the light modulator 225R, 225G and 225B are combined into a single light beam by, for example, dichroic mirrors 230R, 230G, and 230B reflecting light of specific wavelengths and transmitting light of other wavelengths. The combined light may be transmitted to the optical scanner 250. Here, the optical scanner 250 may be identical with the optical scanner 10 or the optical scanner 100. The combined light may be scanned to the screen 260 by the optical scanner 250, and thereby a picture may be formed on the screen. At this moment, it may be possible to vertically and horizontally scan the combined light by using two optical scanners 250.

An optical scanner according to the present invention and a laser image projector using the same have been described till now. However, the optical scanner according to the present invention may be applied not only to a laser image projector but also to all devices requiring scanning of a micro beam.

As stated above, the present invention can improve a driving angle of an optical scanner without increasing the thickness of a mirror unit. Therefore, the present invention can increase a driving angle of an optical scanner without deteriorating a driving speed of the optical scanner, thereby making it possible to remarkably improve resolution of an image resulting from the optical scanner.

Also, since merely a structure of a static comb electrode may be changed into a two-layered structure according to an embodiment of the invention, the invention may be used without changing the structure and design values of the conventional optical scanner. Therefore, it may be possible to manufacture the optical scanner according to the present invention without changing the conventional manufacturing process.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical scanner comprising:
   a substrate;
   a mirror unit suspended over the substrate and spaced apart from the substrate by a predetermined distance;
   a supporter situated on the substrate and supporting both ends of the mirror unit so that the mirror unit is suspended over the substrate;
   a supporting axis connected between both ends of the mirror unit and the supporter so that the mirror unit is rotatably supported by the supporter;
   a plurality of movable comb electrodes vertically formed on both sides of the mirror unit; and
   a plurality of static comb electrodes vertically formed on one surface of the substrate in such a way that the static comb electrodes alternate with the movable comb electrodes,
   wherein the static comb electrode is a two-layer structured electrode.

2. The optical scanner of claim 1, wherein the two-layer structured static comb electrode comprises:
   a first static comb electrode formed on the substrate;
   an insulation layer formed on the first static comb; and
   a second static comb electrode formed on the insulation layer.

3. The optical scanner of claim 2, wherein an absolute value of a voltage applied to the first static comb electrode is larger than an absolute value of a voltage applied to the second static comb electrode.

4. The optical scanner of claim 2, wherein a voltage is applied to the first comb electrode after the movable comb electrode completely enters between the second static comb electrodes by rotation of the mirror unit.

5. The optical scanner of claim 1, wherein the movable comb electrodes are vertically formed on both sides of the mirror unit at a regular interval.

6. The optical scanner of claim 1, wherein the supporting axis is a torsion spring formed between both ends of the mirror unit and the supporter.

7. An optical scanner comprising:
   a mirror unit reflecting a light;
   an upper substrate arranged over the mirror unit and spaced apart from the mirror unit by a predetermined distance;
   a lower substrate arranged under the mirror unit and spaced apart from the mirror unit by a predetermined distance;
   a supporter supporting both ends of the mirror unit so that the mirror unit is suspended between the upper substrate and the lower substrate;
   a supporting axis connected between both ends of the mirror unit and the supporter so that the mirror unit is rotatably supported by the supporter;
   a plurality of movable comb electrodes vertically formed on both sides of the mirror unit;
   a plurality of upper static comb electrodes vertically arranged on a lower surface of the upper substrate in such a way that the upper static comb electrodes alternate with the movable comb electrodes; and
   a plurality of lower static comb electrodes vertically arranged on the lower substrate in such a way that the lower static comb electrodes alternate with the movable comb electrodes,
   wherein the upper static comb electrode and the lower static comb electrode are a two-layer structured electrode.

8. The optical scanner of claim 7, wherein the two-layer structured upper static comb electrode comprises:
   a first upper static comb electrode vertically formed on a lower surface of the upper substrate in such a way that the first upper static comb electrode alternates with the movable comb electrode;
   an insulation layer formed on the first upper static comb electrode; and
   a second upper static comb electrode formed on the insulation layer.

9. The optical scanner of claim 8, wherein the two-layer structured lower static comb electrode comprises:
   a first lower static comb electrode vertically formed on the upper surface of the lower substrate in such a way that the first lower static comb electrode alternates with the movable comb electrode;
   an insulation layer formed on the first lower static comb electrode; and
   a second lower static comb electrode formed on the insulation layer.

10. The optical scanner of claim 9, wherein an absolute value of a voltage applied to a lower static comb electrode located at a right side of the mirror unit is identical with an absolute value of a voltage applied to an upper static comb electrode located at a left side of the mirror unit, and an absolute value of a voltage applied to an upper static comb electrode located at a right side of the mirror unit is identical with an absolute value of a voltage applied to a lower static comb electrode located at a left side of the mirror unit.

11. The optical scanner of claim 9, wherein an absolute value of a voltage applied to the first lower static comb electrode is larger than an absolute value of a voltage applied to the second lower static comb electrode, and an absolute value of a voltage applied to the first upper static comb electrode is larger than an absolute value of a voltage applied to the second upper static comb electrode.

12. The optical scanner of claim 11, wherein a voltage is applied to the first upper and lower static comb electrodes after the movable comb electrode completely enters between the second upper and lower static comb electrodes by rotation of the mirror unit.

13. The optical scanner of claim 7, wherein the movable comb electrodes are vertically formed on both sides of the mirror unit at a regular interval.

14. The optical scanner of claim 7, wherein the supporter is fixed to at least one of the upper substrate and the lower substrate.

15. A laser image projector comprising:
    a plurality of light sources respectively emitting monochromatic lights of different wavelengths;
    light modulators respectively modulating the monochromatic lights according to their color signals;
    a light combiner combining the modulated monochromatic lights from the light modulators into a beam;
    an optical scanner scanning the combined beam so that the combined beam forms a picture; and
    a screen on which the scanned picture is formed,
    wherein the optical scanner includes:
    a substrate;
    a mirror unit suspended over the substrate and spaced apart from the substrate by a predetermined distance;
    a supporter situated on the substrate and supporting both ends of the mirror unit so that the mirror unit is suspended over the substrate;

a supporting axis connected between both ends of the mirror unit and the supporter so that the mirror unit is rotatably supported by the supporter;

a plurality of movable comb electrodes vertically formed on both sides of the mirror unit; and a plurality of static comb electrodes vertically formed on one surface of the substrate in such a way that the static comb electrodes alternate with the movable comb electrodes, wherein the static comb electrode is a two-layer structured electrode.

16. The laser image projector of claim 15, wherein the two-layer structured static comb electrode comprises:

a first static comb electrode formed on the substrate;

an insulation layer formed on the first static comb; and a second static comb electrode formed on the insulation layer.

17. The laser image projector of claim 15, wherein an absolute value of a voltage applied to the first static comb electrode is larger than an absolute value of a voltage applied to the second static comb electrode.

18. A laser image projector comprising:

a plurality of light sources respectively emitting monochromatic lights of different wavelengths;

light modulators respectively modulating the monochromatic lights according to their color signals;

a light combiner combining the modulated monochromatic lights from the light modulators into a beam;

an optical scanner scanning the combined beam so that the combined beam forms a picture; and a screen on which the scanned picture is formed, wherein the optical scanner includes:

a mirror unit reflecting a light;

an upper substrate arranged over the mirror unit and spaced apart from the mirror unit by a predetermined distance;

a lower substrate arranged under the mirror unit and spaced apart from the mirror unit by a predetermined distance;

a supporter supporting both ends of the mirror unit so that the mirror unit is suspended between the upper substrate and the lower substrate;

a supporting axis connected between both ends of the mirror unit and the supporter so that the mirror unit is rotatably supported by the supporter;

a plurality of movable comb electrodes vertically formed on both sides of the mirror unit;

a plurality of upper static comb electrodes vertically arranged on a lower surface of the upper substrate in such a way that the upper static comb electrodes alternate with the movable comb electrodes; and a plurality of lower static comb electrodes vertically arranged on the lower substrate in such a way that the lower static comb electrodes alternate with the movable comb electrodes, wherein the upper static comb electrode and the lower static comb electrode are a two-layer structured electrode.

19. The laser image projector of claim 18, wherein the two-layer structured upper static comb electrode comprises:

a first upper static comb electrode vertically formed on a lower surface of the upper substrate in such a way that the first upper static comb electrode alternates with the movable comb electrode;

an insulation layer formed on the first upper static comb electrode; and a second upper static comb electrode formed on the insulation layer.

20. The laser beam projector of claim 19, wherein the two-layer structured lower static comb electrode comprises:

a first lower static comb electrode vertically formed on the upper surface of the lower substrate in such a way that the first lower static comb electrode alternates with the movable comb electrode;

an insulation layer formed on the first lower static comb electrode; and a second lower static comb electrode formed on the insulation layer.

21. The laser beam projector of claim 20, wherein an absolute value of a voltage applied to a lower static comb electrode located at a right side of the mirror unit is identical with an absolute value of a voltage applied to an upper static comb electrode located at a left side of the mirror unit, and an absolute value of a voltage applied to an upper static comb electrode located at a right side of the mirror unit is identical with an absolute value of a voltage applied to a lower static comb electrode located at a left side of the mirror unit.

22. The laser beam projector of claim 20, wherein an absolute value of a voltage applied to the first lower static comb electrode is larger than an absolute value of a voltage applied to the second lower static comb electrode, and an absolute value of a voltage applied to the first upper static comb electrode is larger than an absolute value of a voltage applied to the second upper static comb electrode.

* * * * *